United States Patent

[11] 3,587,693

[72] Inventors Manfred Rogalski
 3261 Rumbeck Nr. 25, Rumbeck nr.;
 Friedrich Otto, 325 Hamelin Anton-
 Bruckner Str. 6, Hamelin, Germany
[21] Appl. No. 822,865
[22] Filed May 5, 1969
[45] Patented June 28, 1971
[73] Assignee A. Stephan U. Sohne
 Hamelin, Germany
[32] Priority May 4, 1968
[33] Germany
[31] P 17 57 415.1

[54] COMMINUTING APPARATUS FOR RAW AND COOKED MEAT
 9 Claims, 6 Drawing Figs.
[52] U.S. Cl. .................................................. 146/192
[51] Int. Cl. .................................................... A22c 11/00,
 B02c 18/12
[50] Field of Search ........................................ 146/192,
 182

[56] References Cited
 UNITED STATES PATENTS
2,719,011 9/1955 Bebinger .................... 146/192X
2,902,225 9/1959 Hoaglund ..................... 146/192X
 FOREIGN PATENTS
1,045,508 10/1966 Great Britain ............... 146/192

Primary Examiner—Willie G. Abercrombie
Attorney—Michael S. Striker

ABSTRACT: Comminuting apparatus for raw and cooked meat comprising a housing having inlet means; rotary drive means journaled in said housing; and two sets of cutting means provided in said housing, one of them being affixed to said drive means, both said sets of cutting means being annular and concentric and one set rotating relative to the other. Said cutting means include a cutting member and a cutting annulus including an intermediate annulus engaging over said cutting member, and each having cutting means one cutting means each of said intermediate annulus engages between two cutting means each of the cutting annulus, in order to define with them cutting gaps; said inlet means being arranged to admit meat into the range of the cutting means of said cutting member, and the intermediate annulus being provided on its internal cylindrical cutting means surface directed towards the cutting member with superimposed guide ribs positioned in the direction of rotation.

COMMINUTING APPARATUS FOR RAW AND COOKED MEAT

BACKGROUND OF THE INVENTION

Apparatus for comminuting raw and cooked meat comprising a housing having inlet means; rotary drive means journaled in said housing; and two sets of cutting means provided in said housing, one of them being affixed to said drive means, whereby both said sets of cutting means are positioned on one annulus each rotating concentrically and relatively to each other, whereby said cutting means take the form of a cutting member and a cutting annulus engaging over said cutting member, whereby one cutting means each of an intermediary annulus engages between two cutting means each of the cutting annulus, in order to define between them the exact width of the cutting gap; said inlet means being arranged to admit meat into the range of cutting means of said cutting member. Such apparatus for comminuting raw and cooked meat is known. A corresponding embodiment of such an apparatus is, e.g., being described in German Pat. No. 1,117,439.

Apparatus of the just outlined character has found widespread acceptance in industrial meat-processing establishments. Exhaustive tests have shown, however, that the degree of fineness of the material treated in such apparatus and, moreover, also the ability to maintain the cutting power of the cutting means can be essentially improved if the meat to be cut which is flung against the cutting annulus by the cutting member is distributed as uniformly as possible over the entire cutting height.

SUMMARY OF THE INVENTION

It is an object of our invention to provide an apparatus wherein the intermediate annulus is provided on its internal cylindrical cutting means surface directed towards the cutting member, with superimposed guide ribs positioned in the direction of rotation.

Another object of the invention is to provide an apparatus wherein said guide ribs are formed by grooves provided in the internal cylindrical surface of the intermediate annulus.

The novel features which are considered as characteristic of the invention are set forth in particular in the appended claims. The improved comminuting apparatus itself, however, together with additional features and advantages thereof, will be best understood upon perusal of the following description with reference to the accompanying drawing.

DESCRIPTION OF THE PREFERRED EMBODIMENTS

Figure 1:
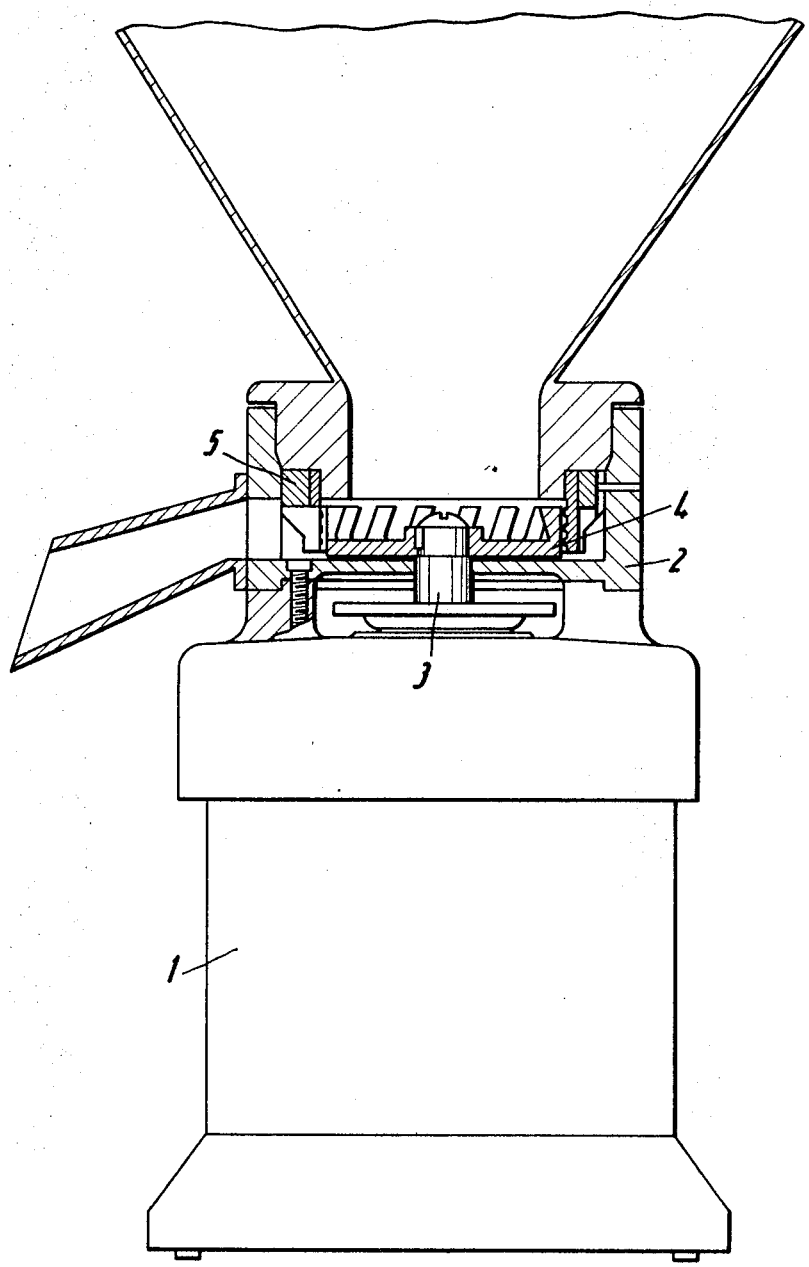
FIG. 1 is a partly sectional view of the machine comprising the comminuting apparatus which embodies our invention.
Figure 2:
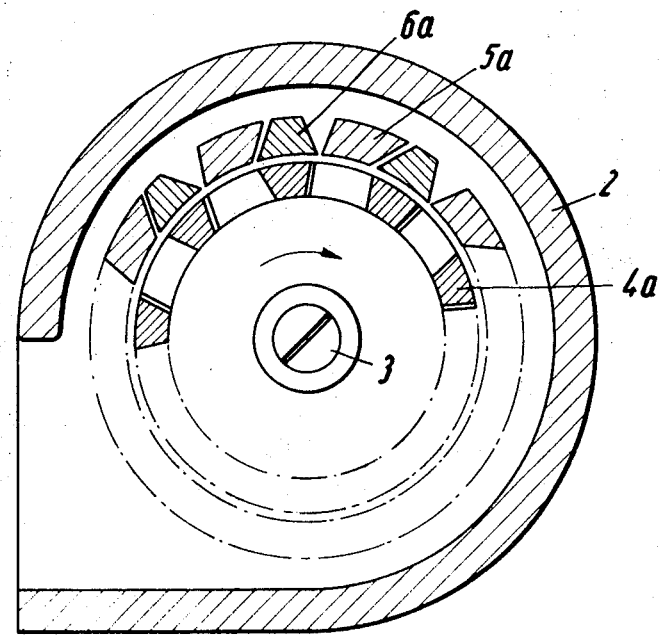
FIG. 2 is a cross-sectional view of the cutting housing.
Figure 3:
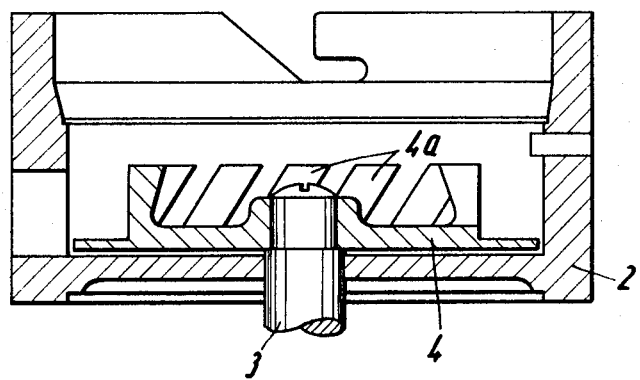
FIG. 3 is a sectional view of the cutting member.
Figure 4:
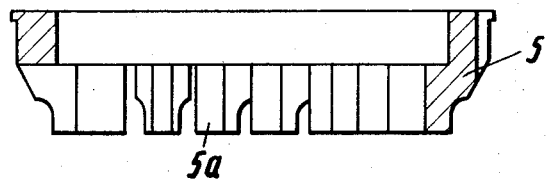
FIG. 4 is a sectional view of the cutting annulus.

FIG. 1 illustrates an apparatus for comminuting raw and cooked meat which comprises a cutting housing 2 affixed atop a motor housing 1' and a vertical drive shaft 3 penetrating through the bottom of the cutting housing 2, whereby said drive shaft drives a cutting member 4. This cutting member 4 is surrounded by a cutting annulus 5.

Figure 6:
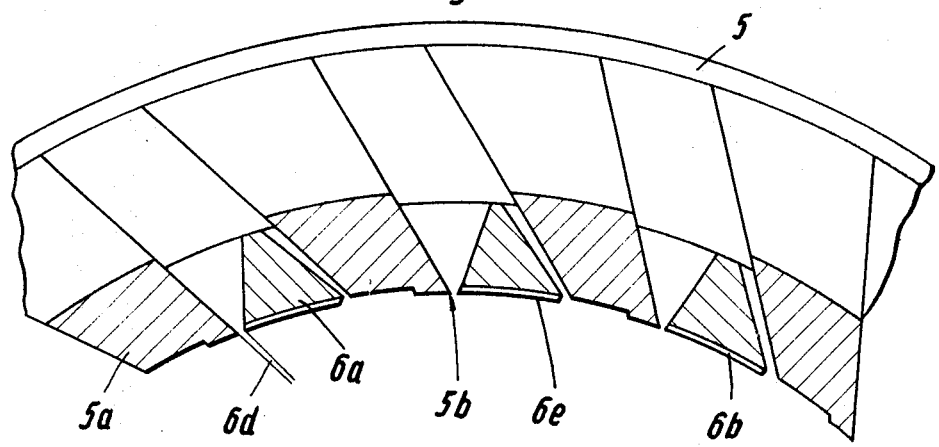
FIG. 6 is a partly top view of the cutting annulus and the intermediate annulus.

The cutting means 4a of the cutting member 4 are inclined and their cutting edges are opposed to those of the cutting means 5a of the cutting annulus. One cutting means 6a each of an intermediate annulus 6 secured to the cutting annulus 5 engages between two cutting means 5a each of the cutting annulus 5 to define with the cutting means 5a the cutting gaps 6d (FIG. 6).

Figure 5:
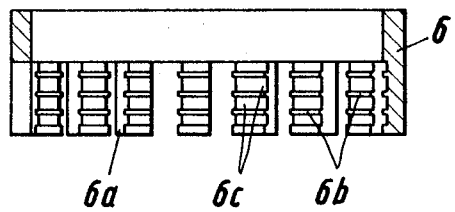
FIG. 5 is a sectional view of the new intermediate annulus.

As becomes evident from FIG. 5, the intermediate annulus 6 is provided on the internal cylindrical surface of the cutting means 6a with several superimposed guide ribs 6b positioned in the direction of rotation. While the height of these ribs is approximately 0.079 inches, they are spaced-apart approximately 0.197 inches. These ribs are provided by forming grooves 6c in the intermediate annulus 6.

As the cutting means 6a of the intermediate annulus 6 are of trapezoidal cross section, the ends of the guide ribs 6b project over those of the grooves 6c. The ends of these guide ribs 6b are positioned very near to the opposed cutting edge 5b of the cutting annulus 5 (FIG. 6).

The meat to be cut which is fed into the cutting member 4 is, due to the elevated rotational speed of the latter caused by the drive shaft 3, flung through the cutting means 4a of the cutting member 4 against the internal surface of the cutting annulus 5. There, it is evenly and uniformly distributed over the entire cutting height by means of the novel guide ribs 6b, and consequently, the entire meat mass is comminuted quickly and uniformly by passing between the sets of cutting means 4a and 5a, 6a rotating relatively to each other.

This invention assures an excellent quality of the meat due to the high efficiency of the machine while simultaneously achieving an outstanding ability to maintain the cutting power of the cutting means.

We claim:

1. A comminuting apparatus, particularly for raw and cooked meat, comprising in combination, a housing defining a cutting chamber and being provided with material-admitting inlet means and with outlet means both communicating with said chamber; a cutting assembly installed in said chamber in the path of material advancing to said outlet means, said cutting assembly including an inner ring-shaped cutting member having an annulus of circumferentially spaced teeth, a coaxial ring-shaped outer cutting member also having an annulus of circumferentially spaced teeth, and an insert member associated with one of said cutting members and having an annulus of circumferentially spaced supplementary teeth each of which is located between two adjacent teeth of said annulus of said one member, said adjacent teeth and said supplementary teeth defining with one another gaps for passage of the material; a plurality of guide ribs provided on a circumferential surface of said insert which faces the other of said members, said guide ribs being elongated in circumferential direction; and drive means associated with at least one of said cutting members for rotating the same about its axis in the direction of elongation of said guide ribs.

2. A comminuting apparatus as defined in claim 1, wherein said one member is said outer member, and wherein said circumferential surface is an inwardly directed circumferential surface of said insert member.

3. A comminuting apparatus as defined in claim 2, wherein said inwardly directed circumferential surface is composed of a plurality of discrete surface portions each provided on one of said supplementary teeth, each of said guide ribs being composed of a plurality of discontinuous sections which are each provided on one of said surface portions.

4. A comminuting apparatus as defined in claim 3, wherein said guide ribs of said plurality of guide ribs are spaced from one another in axial direction of said annulus of supplementary teeth.

5. A comminuting apparatus as defined in claim 3, wherein each of said sections has a height of substantially 0.079 inch in axial direction of said annulus of supplementary teeth.

6. A comminuting apparatus as defined in claim 4, said ribs being spaced from one another in said axial direction by a distance of substantially 0.197 inch.

7. A comminuting apparatus as defined in claim 6, wherein each of said sections has a height of substantially 0.079 inch in said axial direction.

8. A comminuting apparatus as defined in claim 3, said plurality of guide ribs being spaced from one another in axial direction of said annulus of supplementary teeth, and by a distance which corresponds to more than twice the height of said guide ribs in said axial direction.

9. A comminuting apparatus as defined in claim 2, wherein said inwardly directed circumferential surface is provided with a plurality of axially spaced grooves, said ribs being constituted by the surface portions intermediate said grooves.